United States Patent [19]
Updike

[11] 4,190,221
[45] Feb. 26, 1980

[54] SECURITY MOUNTING

[76] Inventor: Peter E. Updike, 3949 Olive Ave., Long Beach, Calif. 90807

[21] Appl. No.: 906,959

[22] Filed: May 18, 1978

[51] Int. Cl.² ............................................. F16M 13/00
[52] U.S. Cl. ..................... 248/551; 248/489; 248/222.4; 248/225.1
[58] Field of Search ............... 248/73, 203, 205 R, 248/222.4, 225.1, 489, 497, 498, 551

[56] References Cited

U.S. PATENT DOCUMENTS

| | | | |
|---|---|---|---|
| 1,651,987 | 12/1927 | Baker | 248/222.4 X |
| 1,835,042 | 12/1931 | Hammer | 248/498 X |
| 3,323,847 | 6/1967 | Clouthier | 248/225.1 X |
| 3,928,929 | 12/1975 | Forte | 248/225.2 X |

FOREIGN PATENT DOCUMENTS

| | | | |
|---|---|---|---|
| 941688 | 4/1956 | Fed. Rep. of Germany | 248/222.4 |
| 160713 | 6/1933 | Switzerland | 248/497 |

*Primary Examiner*—William H. Schultz

*Attorney, Agent, or Firm*—Edward D. O'Brian; K. H. Boswell

[57] ABSTRACT

A security mounting for attaching a movable component to a stationary component has a pin with an enlarged head attached to either the movable or the stationary component. A bracket which has a tortuous channel extending through a face plate on the bracket is attached to the other component. Within the tortuous channel is an opening which allows the pin to be inserted into the channel. The pin is inserted in the channel and slid along the tortuous path of the channel until the pin rests in a terminus end within the channel. To remove the movable component from the stationary component one must have prior knowledge that it is necessary to direct the pin along the tortuous path of the channel in order to free the movable component from the stationary component. This presents a deterrent for removing the movable component from the stationary component.

6 Claims, 5 Drawing Figures

SECURITY MOUNTING

BACKGROUND OF THE INVENTION

This invention is directed to a security mounting of the type wherein a movable component is attached to a stationary component by a bracket having a tortuous channel and a pin sliding within the channel.

Numerous devices have been described which allow the attachment of a movable object such as a mirror or picture to a stationary wall. Generally these consist of combinations of hooks and wires and depend upon the gravity of the movable object to hold the movable object to the stationary wall. In certain instances it is important that the brackets or other mounting hardware used are of such a nature that an unauthorized person will be deterred from removing the picture or mirror from the wall.

Numerous tamper-proof mounting devices have been described. Representative examples include those in U.S. Pat. No. 1,908,174, U.S. Pat. No. 3,952,436 and U.S. Pat. No. 2,928,199. While these devices are considered very utilitarian they require the use of a tool to dismount the movable object from the wall, etc. In situations such as public lavoratories wherein a permanent type mounting of a mirror to a wall is desired, this type of mounting system can be very useful; however, since special tools are required for dismounting these objects and those special tools sometimes have a way of getting lost, there are instances where this type of mounting is not practical.

In commercial art galleries and the like where valuable paintings, etchings and sculptures are displayed for sale, it is considered highly desirable that these art objects be displayed in full public view utilizing mounting systems which will deter unauthorized persons from removing them. However, upon the sale of these objects to the art patron, or rearrangement for better display purposes, easy removal of the objects is necessary.

In instances such as reception rooms for legal and medical offices it is desirable that objects such as expensive onyx ashtrays, etc., both be attached to the tables on which they rest so that they cannot be removed by unauthorized persons and also easily disengaged from their mountings by janitorial staff for cleaning. It is also sometimes desirable to attach objects such as telephones and lamps to the respective pedestal bases on which they are set so that they cannot be moved or inadvertently disturbed by children or pets, but can be easily dismounted when so desired.

Mounting brackets generally used for hanging pictures and mirrors are not interchangeable with mounting brackets for stationary objects such as ashtrays and telephones. Further mounting brackets which require exact placement or alignment of several components aside from usually being expensive are sometimes not practical in that the user does not have the necessary supplemental equipment, such as levels and rules which must be used to effect the exact placement of the components of this type of mounting system.

BRIEF SUMMARY OF THE INVENTION

In view of the above it is considered that there exists a need for new and improved security mountings. It is an object of this invention to provide a security mounting that can be used to mount objects to both vertical and horizontal surfaces. It is a further object to provide a security mounting which is easily attached to both the objects and the surfaces and which requires no special tools in attaching or detaching the object from the surface. Additionally it is an object to provide a security mounting that is simple to manufacture and thus inexpensive to the consumer and as such, can be used for both precious and semi-precious objects.

These and other objects are achieved by providing a security mounting system having a bracket which attaches to one of the components, either the stationary or movable component, and a pin which interacts with the bracket and attaches to the other component. The bracket has a face plate wherein a tortuous channel winds across the surface of a plate. The pin has an enlarged head and the channel has an opening which allows for the head to be inserted through the channel. The pin is then slid along the tortuous path and directed toward a terminus branch within the channel wherein the pin is allowed to rest. In this position the movable object is securely mounted to the stationary object.

To remove the movable object it is necessary to slide the pin back through the tortuous channel. However, if the person so moving the object is not aware of the pattern of a channel the person is deterred from moving the pin within the channel and consequently from moving the movable object from the stationary support.

It is envisioned that a variety of brackets, each having a somewhat differently shaped channel, can be used so that only the user will be aware of exactly what direction the pin must be moved in order to successfully move the pin through the maze defined by the tortuous channel.

BRIEF DESCRIPTION OF THE DRAWING

The invention set forth in this specification is best described when taken in conjunction with the drawing in which.

The invention described in this specification uses certain operative principles and concepts as are set forth and defined in the appended claims. It will be appreciated that those skilled in the art to which this specification pertains will realize that these principles and concepts can be applied to a number of differently appearing and differently described embodiments. For this reason the invention is not to be construed as being limited to the exact embodiments described, but is to be defined in light of the appended claims.

DETAILED DESCRIPTION

Figure 1:
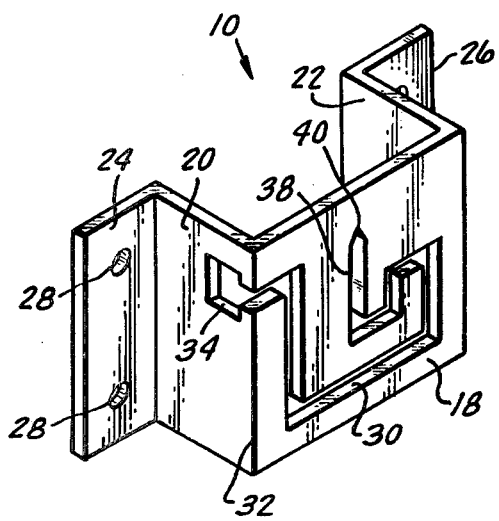
FIG. 1 is a front isometric view of a first embodiment of the bracket component of the invention.
Figure 2:
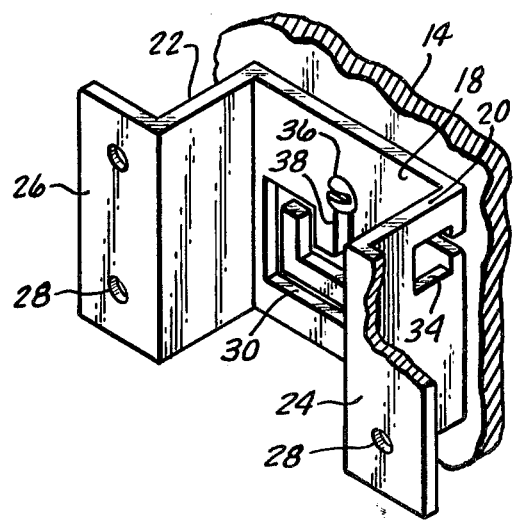
FIG. 2 is a rear isometric view of the bracket component of FIG. 1 and the pin component attached to a stationary object to which a movable object is to be secured.
Figure 3:
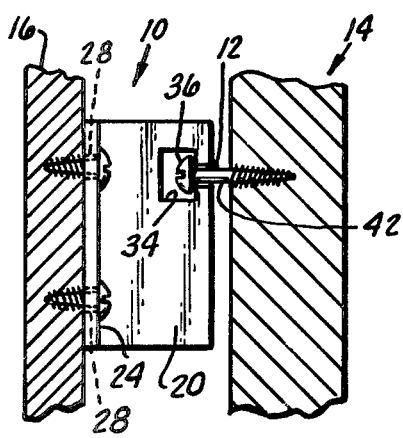
FIG. 3 is a side elevational view in partial section of the bracket and pin shown in FIG. 2 with the addition of the bracket being mounted to a movable object.

Referring now to FIGS. 1 through 3 there is shown a bracket 10 which interacts with a pin 12 to form a security mounting between a movable object and a fixed object. As shown in FIGS. 2 and 3, a wall 14 will be utilized as the fixed object and a picture frame 16 will represent the movable object. It must at this point be stressed that it is not mandatory for the bracket 10 to be attached to the movable object 16 and the pin 12 to the fixed object 14. The invention will function just as effectively if the bracket 10 is attached to the fixed object 14 and the pin 12 is attached to the movable object 16.

Bracket 10 has a face plate 18. Two side walls 20 and 22 are attached to the face plate 18. Attached to side walls 20 and 22 are mounting ears 24 and 26. As shown in the figures the side walls 20 and 22 attached to the face plate 18 and the ears 24 and 26 attach to the side walls 20 and 22 at 90 degree angles. Generally this will be the preferred configuration; however, these angles of attachment could vary from illustrated 90 degrees as long as the plane in which ears 24 and 26 lie is parallel to the plane in which face plate 18 lies.

Ears 24 and 26 are provided with holes collectively identified by the numeral 28. The bracket 10 is attached to either the movable or stationary object by screws or other similar attaching means via holes 28. Weaving across the surface of the face plate 18 is a tortuous channel 30. Channel 30 meets the edge 32 wherein face plate 18 meets side wall 20. In side wall 20 there is provided a hole 34 which communicates with channel 30. Hole 34 is of sufficient dimension to allow the end 36 of pin 12 to traverse through it as more fully described below. At the opposite ends of channel 30 is the terminus branch 38 of this channel. Generally the end 40 of this terminus branch will either be rounded or pointed in shape such that the shaft 42 of pin 12 fits snugly inside the end of the terminus branch 38 of the channel 30.

As described, pin 12 has a shaft 42 having an enlarged end 36. The shaft 42 is shown in FIG. 3 as having screw threads by which the pin 12 is attached to object 14. Thus, as described, pin 12 is in essence a round headed screw. Equally useful would be a nail or round headed bolt chosen such that it would fit within the channel 30 but its head would be of sufficient size to hold the pin to the bracket.

In FIG. 1 the end 40 of the terminus branch 38 is shown pointing in an upward direction. In this configuration the bracket 10 will generally be attached to the movable object when the object is being suspended from a stationary wall or other support. The object will be smoothly suspended by the bracket 10 about a pin 12 fitting in this terminus branch 38. If it is desired to mount the bracket to the stationary object and the pin to the movable object, the bracket will be mounted to the stationary object upside down from that shown in FIG. 1. Thus the terminus end 40 will point in a downward direction and the weight of the object will hold the pin securely in this terminus end.

Figure 4:
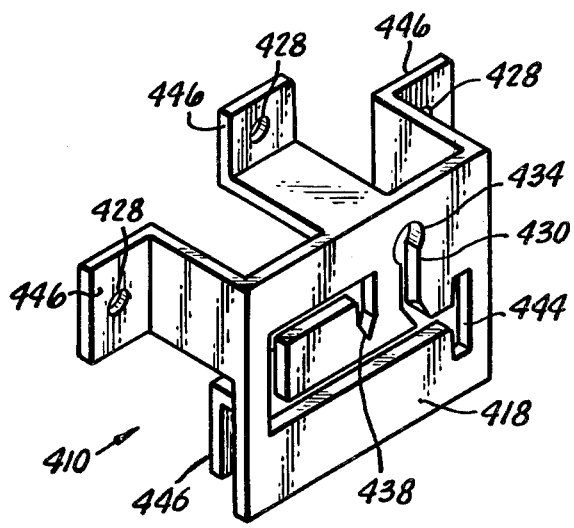
FIG. 4 is a front isometric view of a second alternate embodiment of the invention.
Figure 5:
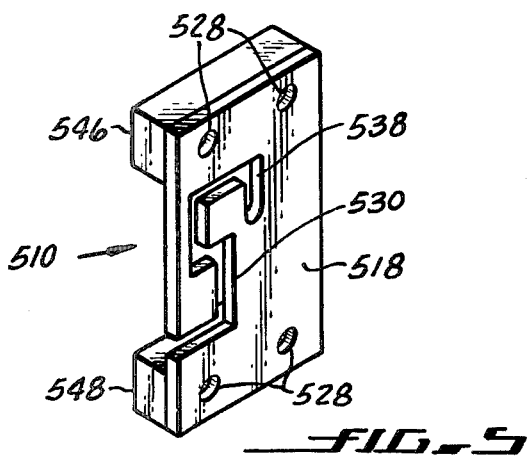
FIG. 5 is a front isometric view of a third embodiment of the invention.

In the alternate embodiments shown in FIGS. 4 and 5 those components having a similar function as those previously described will be identified by the numeral previously used preceded by the numeral "4" for FIG. 4 and the numeral "5" for FIG. 5. Alternate embodiments described in FIGS. 4 and 5 differ from that previously described in two respects, i.e., the tortuous channels 430 and 530 and the method of attachment of the bracket to the object. The configuration of the tortuous channels 430 and 530 differ from the configuration of tortuous channel 30. Other configurations of tortuous channels are also possible and highly desirable. Since when a movable object is mounted to a stationary object utilizing the security mounting of this invention the tortuous channel is hidden from view, a prospective unauthorized person will not know the configuration of the tortuous channel utilized in the security mounting. By having a variety of tortuous channels a further deterrent to unauthorized removal is provided.

The tortuous channel 430 shown in FIG. 4 also differs from the tortuous channel 30 previously described in that the hole 434 is not along the edge of the face plate but is within the surface of the face plate 418. Also the tortuous channel 430 includes an blind branch 444. An unauthorized person attempting to remove an object attached with the mounting bracket 410 would be confused by the anonymous branch 444.

Bracket 410 is shown with four ears collectively identified by numeral 446 by which the bracket 410 is attached. These ears 446 are shown to be integrally formed with the face plate 418 and are symmetrically spaced about the face plate 418. In FIG. 5 in place of these attachment ears 446 the face plate 518 is attached to two spacing plates 546 and 548. Traversing through both face plate 518 and spacing plates 546 and 548 are attaching holes collectively identified by numeral 528. As with the previously described embodiments the spacing plates provide a space for the enlarged end 536 of the pin 512 between the support which the bracket is attached to and the face plate 518. Since the channel 530 opens directly into an open space, there is no need for an enlarged hole corresponding to hole 34.

Most generally both the bracket 10 and pin 12 are formed from a metal; however, other tough material such as hard plastic could be used for the bracket 10. It is envisioned that the bracket portion 10 could be integrally formed in a plastic or metal frame used for hanging pictures and the like.

An additional feature of the invention is because the pin 12 must traverse a tortuous pathway to be free from the bracket 10, during an earthquake or other sudden movement of the fixed support, the likelihood of the pin being inadvertently moved through the tortuous channel is essentially nil. This protects the movable object from accidental damage.

I claim:
1. A security mounting of the type for reversibly attaching a movable component to a stationary component which comprises:
   a pin means having an enlarged head;
   said pin means attached to one of said movable or stationary components;
   a bracket member;
   said bracket member including attaching means;
   said attaching means attaching said bracket member to the other of said movable or stationary component;
   said bracket member including a face plate;
   said face plate having a tortuous channel winding through said face plate;
   said tortuous channel having a dimension across its width intermediate the diameter of said pin means and the dimension of said enlarged head;
   said tortuous channel including a first branch having an opening allowing said pin means to be inserted into said tortuous channel, a terminus branch at the opposite end of said tortuous channel from said first branch and a plurality of other branches located between said first branch and said terminus branch, the configuration of which forms a maze such that said pin means is inserted in said opening, and said pin means is slid along said tortuous channel until said pin means rests in said terminus branch attaching said movable component to said stationary component.

2. The security mounting of claim 1 wherein:
said bracket means includes a face plate, attaching ears, spacer means between said face plate and said attaching ears connecting said attaching ears to said face plate, said attaching ears having a plurality of holes such that an attachment screw or nail is passed through said holes attaching said bracket to one of said components.

3. The security mounting of claim 1 wherein:
said channel includes an blind branch.

4. The security mounting of claim 1 wherein:
said pin includes screw threads on said pin wherein said pin is screwed into one of said components.

5. The security mounting of claim 1 wherein:
said bracket means comprises a face plate, said face plate having a tortuous channel winding through said face plate, said tortuous channel having a dimension across its width intermediate the diameter of said pin and the dimension of said enlarged head, said attaching means includes two spacer plates, one spacer plate attached to one end of said face plate, the other spacer plate attached to the other end of said face plate, said face plate and said spacer plates having a plurality of attaching holes common to both said face plate and said spacer plates such that an attachment screw or nail is passed through said holes attaching said bracket to one of said components.

6. A security mounting of the type for reversibly attaching a movable component to a stationary component which comprises:
a pin means having an enlarged head;
said pin means attached to one of said movable or stationary components;
a bracket member;
said bracket member including attaching means;
said attaching means attaching said bracket member to the other of said movable or stationary component;
said bracket member including a face plate;
said face plate having a tortuous channel winding through said face plate;
said tortuous channel having a dimension across its width intermediate the diameter of said pin means and the dimension of said enlarged head;
said tortuous channel including a first branch having an opening allowing said pin means to be inserted into said tortuous channel;
a terminus branch and at least three intermediate branches located between said first branch and said terminus branch such that any two adjacent branches intersect each other at an angle requiring that when said pin means is inserted into said opening and said pin means is slid along said tortuous channel said movable or said stationary component to which said pin means is attached must be moved in a pattern requiring a combination of physical moves to allow said pin means to slide from one branch to the next adjoining branch.

* * * * *